Figures 1, 2:
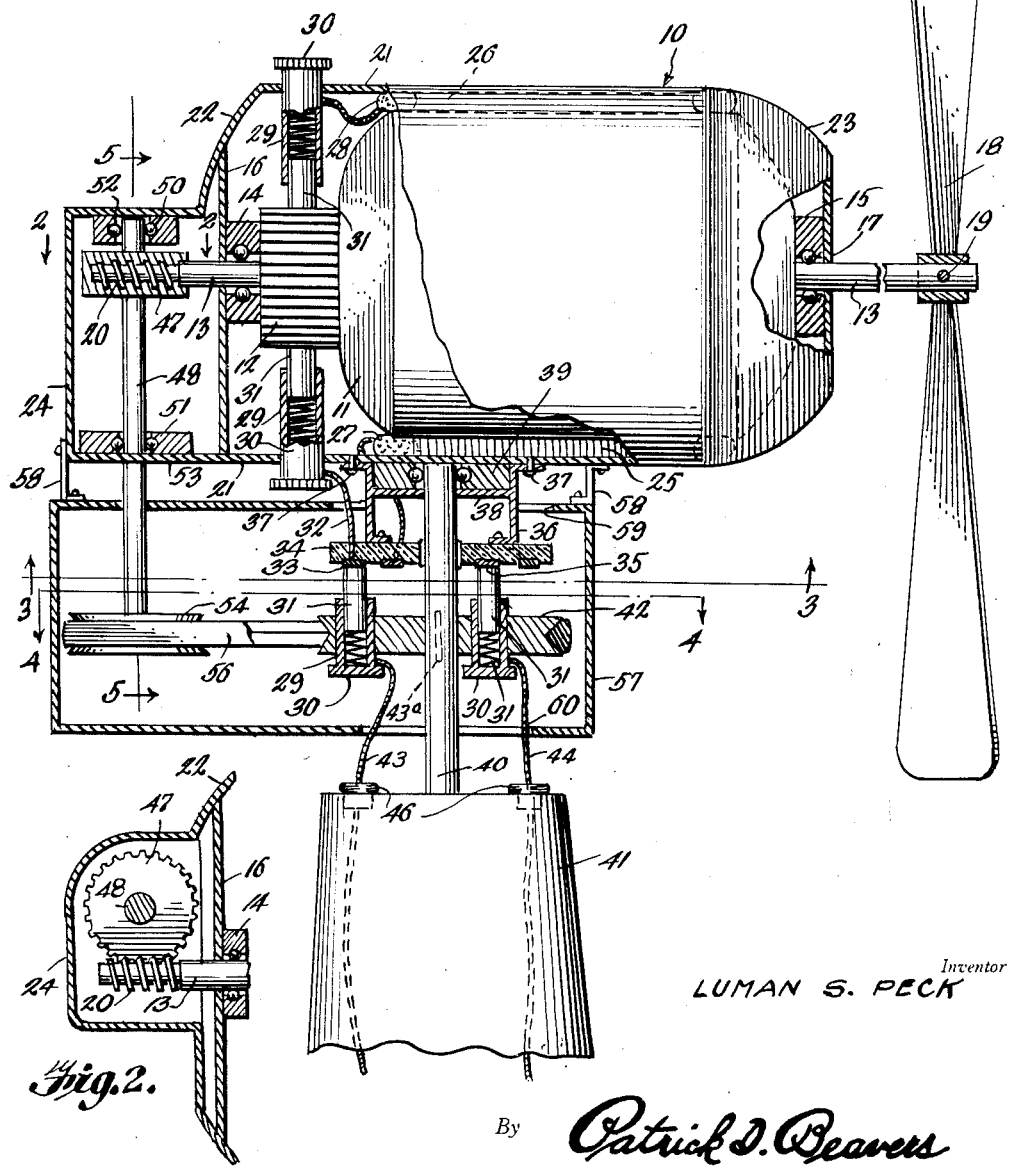

Feb. 20, 1951 L. S. PECK 2,542,427
ELECTRIC FAN
Filed March 11, 1949 2 Sheets-Sheet 1

Inventor
LUMAN S. PECK
By Patrick D. Beavers
Attorney

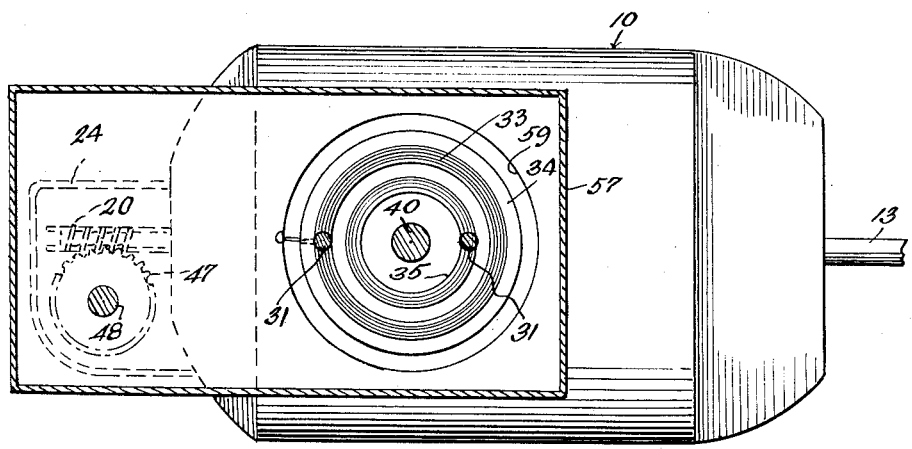
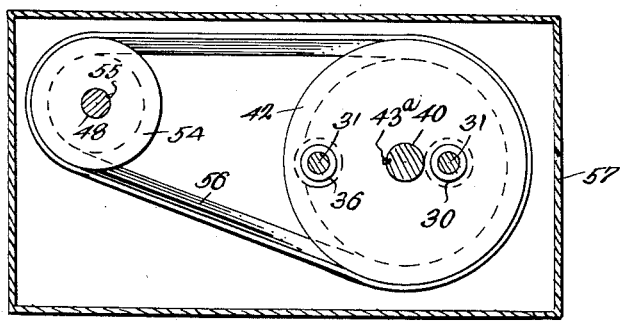
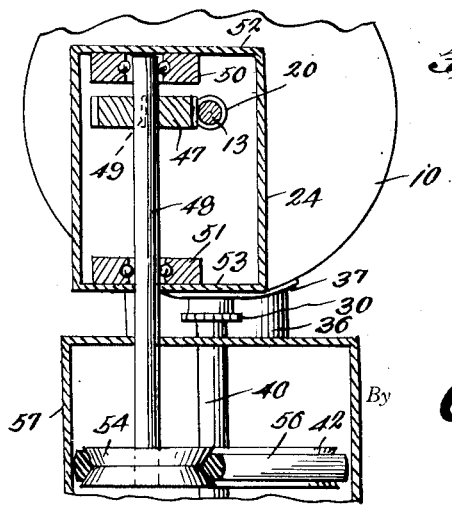
Inventor
LUMAN S. PECK

Patented Feb. 20, 1951

2,542,427

UNITED STATES PATENT OFFICE 2,542,427

ELECTRIC FAN

Luman S. Peck, Franklin, N. C.

Application March 11, 1949, Serial No. 80,965

2 Claims. (Cl. 230—254)

This invention relates generally to electric air circulating fans of the rotating or oscillating type and more particularly to an electric fan of this character, having new and improved mechanism for rotating the fan and the motor therefor about a vertical pivot through successive 360 degree movements, thereby to move or circulate the air in all directions about the fan.

An object of the present invention is to provide a simple mechanism for rotating the fan and its motor about a pivot support therefor, by means of power derived from the fan motor.

Another object is to provide a relatively quiet drive mechanism for rotating the fan through successive 360 degree movements by power received from the fan motors.

Another object resides in the provision of a simple drive mechanism for rotating the fan and also having provision for continuously supplying the electric power to the fan motor as the fan rotates.

A further object is to provide a mechanism for both rotating the fan and transmitting the electric power thereto as the fan rotates, in which the rotating and power transmitting mechanism may readily be completely enclosed.

A still further object resides in the provision of a fan drive mechanism of the foregoing character, which in addition possesses all of the desired qualities of ease and economy of manufacture, ease of repair and replacement of parts, durability in service, and reliability in performance.

Still other objects, features, advantages, and improvements of the present invention are those relating to the novel combination and arrangement of parts illustrated in the accompanying drawings, and comprising the drive mechanism according to the best mode thus far devised for embodying the principle of the present invention, as will more fully appear from the following detailed description thereof, reference being had to the accompanying drawings wherein:

Figure 1 is a view in elevation of a rotating fan according to the preferred embodiment of the invention, certain parts being broken away, the better to illustrate the specific construction thereof, Figure 2 is a fragmentary sectional view taken along the line 2—2 of Figure 1, and Figures 3, 4 and 5 are sectional views taken respectively along the lines 3—3, 4—4 and 5—5 of Figure 1.

Referring now to the drawings for a more complete understanding of the invention, the numeral 10 generally designates a conventional A. C. or D. C. series type electric fan, which comprises a rotor 11 upon which the usual windings (not shown) are wound and brought out and soldered to the copper bars comprising the commutator 12.

The rotor 11 and commutator 12 are supported on a shaft 13 for rotation therewith, the shaft being supported for rotation in a pair of bearings 14 and 15, which are respectively secured in the position illustrated to motor housing end brackets or plates 16 and 17.

The end of shaft 13 adjacent plate 17 projects therefrom sufficiently to receive and support a fan blade 18 to which it is secured for rotation as by the set screw 19.

The other end of the shaft projects from end plate 16 and terminates in a screw or worm 20 for a purpose more fully to appear as the description proceeds.

The fan motor housing 21 is generally of cylindrical configuration with rounded end wall portions as at 22 and 23, both of which ordinarily in the conventional motor would terminate at the end plates 16 and 17 respectively. The end wall 22, however, for purposes of the present invention, continues beyond end plate 16 and merges with the flat top and side walls of an auxiliary housing 24. Housing 24 also has a flat bottom wall which is a flattened continuation of the cylindrical wall of the motor housing.

The motor stator comprises the usual laminated pole pieces 25 and 26, which are secured to housing 21 in the usual manner and about which the field windings 27 and 28 are respectively wound. The motor also comprises the usual pair of brush assemblies which are secured to the motor housing 21 in the usual manner, and each of which includes an insulator type holder 30 for the brush 31 and a coil spring 29 for urging the brush into contact with the commutator 12, and also serving to connect the brush with the electrical leads connected to the brush assemblies, one of the brushes being thus connected to one end of field winding 28 and the other being connected by a lead or conductor 32 to a conductor ring 33 which is embedded in or otherwise suitably secured to a disc 34 of insulation material. An inner conductor ring 35, similarly secured to disc 34, is connected to one end of field winding 27. The other ends, not shown, of field windings 27 and 28 are interconnected, thereby to complete the series circuit between the stator and rotor of the fan motor.

Insulator ring support disc 34 is suitably secured to the inturned flange of a cylindrical member 36 which, in turn, by means of its outturned flange, is supported as at 37 to the motor housing 21. Member 36 is provided with a partition 38 which serves to retain a bearing 39 in fixed position on the motor housing.

Partition 38 and disc 34 are provided with central openings for receiving a shaft 40, which is secured at one end to the motor support stand 41 and journalled at the other end in bearing 39, the end face of the shaft being in abutting engagement with the motor housing 21, whereby the motor 10 is supported by the shaft 40 for rotation thereabout. To this end, the disc 34, partition 38, and bearing 39 serve to journal the motor 10 on the shaft 40, thereby to provide free and smooth rotation of the motor thereabout.

A V-pulley 42 is secured to shaft 40 as by the key 43a. Pulley 42 has secured thereto a pair of brush assemblies which may be identical to those carried by the motor housing, each including the coil spring 29, insulator type brush holder 30 and brush 31. These last named brush assemblies are arranged on pulley 42 such that the brushes thereof respectively engage the conductor rings 33 and 35, thereby to complete the circuit from the power leads 43 and 44 to the motor. This is accomplished by power lead 43, which is connected to conductor ring 33 through the brush assembly individual thereto and by power lead 44, which is connected to conductor ring 35 through the brush assembly individual thereto, it being recalled that the series circuit of the motor terminates at the conductor rings 33 and 35.

A pair of grommets 46, or the like insulating means preferably are employed for conducting the power leads 43 and 44 through the stand 41 to the connection with the source of power.

The manner in which rotary movement of the motor 10 and fan 18 pivots about 40 is effected by power derived from the motor will now be described.

The worm 20 of motor shaft 13 is arranged to drive a worm wheel 47, which is secured to a shaft 48 therefor as by a key 49. This shaft is suitably journalled in a pair of ball bearings 50 and 51, which are secured in any suitable manner to the upper and lower wall portions 52 and 53 respectively of auxiliary housing 24.

Shaft 48 emerges and descends from housing 24 into the plane of pulley 42 on motor pivot shaft 40, and this end of shaft 48 has a V-pulley 54 secured thereto as by a key 55. An endless flexible belt 56 is trained around pulleys 42 and 54, thereby to complete the drive for causing rotation of the motor about shaft 40 by power derived from the motor, it being understood that as the motor shaft 13 rotates, rotation of pulley 54 is imparted thereto at a slower rate by reason of the speed reduction afforded by the worm-gear combination 20—47, and the pulley 54, in moving along belt 56, causes rotational or planetary movement of shaft 48, and thus motor 10, moves about motor pivot shaft 40.

It will be readily appreciated that the belt drive provides a simple and effective as well as a quiet and shock absorbing method of utilizing power from the fan motor for the purpose of rotating the motor. Moreover, this arrangement has the advantage of permitting enclosure of the rotary drive mechanism and the brush-ring arrangement for transmitting the electrical power to the rotating motor. This is accomplished by the housing 57 which is secured as by brackets 58 to the motor housing 21, and has a central opening for receiving the conductor ring assembly 34—36 and a central opening 60 for free passage of the power leads 43 and 44, it being understood that housing 57 rotates with the motor 10 and belt 56 about the axis of pulley 42 and shaft 40.

From the foregoing it should now be apparent that a circulating electric fan has been provided, which is well adapted to fulfill the aforestated objects of the invention and whereas but a single embodiment of the invention has been disclosed it will be apparent that additional embodiments may be resorted to by those skilled in the art, without departing from the spirit and scope of the invention as defined by the appended claims.

What I claim as my invention is:

1. The combination of a stand, a vertically disposed shaft fixed to the stand, an electric fan motor having a housing pivotally supported on said shaft for rotation thereon, said motor having a horizontally disposed drive shaft journalled in said housing and projected therefrom on both ends, a fan blade secured to one end of said drive shaft, a worm on the other end of the drive shaft, a worm gear arranged to be driven by said worm, a shaft for said worm gear, means including an auxiliary housing for journalling said worm gear shaft in spaced parallelism with respect to said fixed shaft, a V-pulley secured to the worm gear shaft for rotation therewith, a V-pulley secured to the fixed shaft in line with said first named V-pulley, an endless V-belt trained over and between said pulleys, an insulator disc carried by said motor housing concentrically with respect to said fixed shaft, a pair of inner and outer conductor rings carried by said insulator disc concentrically with respect to the fixed shaft, electrical connections between the motor and said conductor rings, a pair of brush assemblies carried by the V-pulley on the fixed shaft and having a pair of brushes engaged respectively by said inner and outer conductor rings, and electrical conductors connected to said brush assemblies and extended through said stand for connection with electrical power for driving said motor.

2. A rotating electric fan according to claim 1 but further characterized by the provision of a housing secured to the motor housing and enclosing the V-pulleys and belt connection therebetween and said conductor ring and brush assemblies co-acting therewith.

LUMAN S. PECK.

REFERENCES CITED

The following references are of record in the file of this patent:

UNITED STATES PATENTS

| Number | Name | Date |
|---|---|---|
| 610,852 | Rolle | Sept. 13, 1898 |
| 1,597,752 | Aalborg | Aug. 31, 1926 |
| 1,694,317 | Good | Dec. 4, 1928 |
| 1,696,232 | Haney | Dec. 25, 1928 |